3,159,635
1-BENZHYDRYL-4-(ALKYL AND ARALKYL) AMINOPIPERAZINES
John W. Cusic, Skokie, and Ernest F. Levon, Morton Grove, Ill., assignors to G. D. Searle & Co., Chicago, Ill., a corporation of Delaware
No Drawing. Filed Oct. 30, 1962, Ser. No. 234,237
11 Claims. (Cl. 260—268)

The present invention relates to derivatives of 1-benzhydryl-4-aminopiperazines in which alkyl and aralkyl groups are substituents on the amino group. More particularly, it relates to compounds having the following general formula

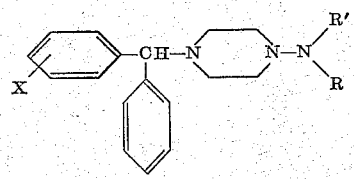

wherein X is selected from the group consisting of hydrogen and halogen; R is selected from the group consisting of lower alkyl and Ar(lower alkyl)— wherein Ar represents phenyl, halophenyl, methylenedioxyphenyl, methoxyphenyl, and hydroxyphenyl; R' is selected from the group consisting of hydrogen and methyl.

The halogen radicals referred to above can be fluorine, chlorine, bromine, or iodine. Likewise, the halophenyl radicals referred to above can be fluorophenyl, chlorophenyl, bromophenyl, or iodophenyl. The lower alkyl radicals referred to above, whether unsubstituted or further substituted by an aromatic group to give the Ar(lower alkyl)— radicals referred to above, contain up to 6 carbon atoms. They can be illustrated by groups such as methyl, ethyl, isopropyl, propyl, butyl, pentyl, and hexyl. Illustrations of the Ar(lower alkyl)— radicals are benzyl, phenethyl, α-methylphenethyl, phenylpropyl, phenylbutyl, and phenylhexyl. In addition, the phenyl groups in the above Ar(lower alkyl)— radicals can be further substituted to give the corresponding halophenyl, methylenedioxyphenyl, hydroxyphenyl, and methoxyphenyl radicals.

The compounds of the present invention are useful because of their valuable pharmacological properties. Thus, they possess anti-convulsant activity which is demonstrated by their inhibition of pentylenetetrazol-induced convulsions and by their antagonism of electroshock seizures. However, the present compounds do not generally display properties as stimulants or depressants of the central nervous system. In addition, the present compounds possess activity as appetite inhibitors, and they are inhibitors of hepatic cholesterol synthesis.

A preferred embodiment of the present invention are those compounds in which R' is hydrogen and R is Ar(lower alkyl)—. In particular, those in which R is Ar—CH$_2$— are preferred.

The organic bases of this invention form pharmaceutically acceptable, non-toxic, acid-addition salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids.

The preferred starting material for the compounds of the present invention are the aminopiperazines corresponding to the formula

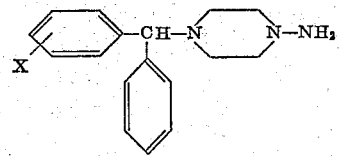

wherein X is hydrogen or halogen. To prepare the hydrazines of this invention where R' is hydrogen, the above aminopiperazines are reacted with the appropriate aldehyde or ketone to give the corresponding hydrazones which are then reduced to the hydrazines. This reduction can be carried out by various means such as lithium aluminum hydride in an inert solvent such as tetrahydrofuran, dimethylamine borane, or hydrogen and a catalyst such as palladium on charcoal. Actually, the procedure referred to above can be carried out in one step by mixing an aminopiperazine with the appropriate aldehyde or ketone and acetic acid in an inert solvent such as ethanol in the presence of a platinum catalyst and hydrogenating.

An alternate method for preparing the compounds of the present invention, which is also applicable to those compounds wherein R' is methyl, consists of converting the 1-benzhydryl-4-aminopiperazines referred to above to the appropriate hydrazide by refluxing the aminopiperazine with an ester such as ethyl formate, or reacting the aminopiperazine with an acid halide such as an acid chloride. The resultant hydrazide is then reduced to the corresponding hydrazine, preferably by means of lithium aluminum hydride in an inert solvent such as tetrahydrofuran.

The compounds which constitute this invention and their preparation will appear more fully from a consideration of the following examples which are given for the purpose of illustration only and are not to be construed as limiting the invention in spirit or in scope. In these examples, quantities are indicated in parts by weight, temperature in degrees centigrade (° C.), and pressures in atmospheres.

*Example 1*

A mixture of 20 parts of 1-benzhydryl-4-aminopiperazine and 69 parts of dry ethyl formate is refluxed for 15 hours. The resultant mixture is allowed to cool whereupon a solid precipitates from the solution. The solid is filtered and dried to give 1-benzhydryl-4-formamidopiperazine melting at about 79–82° C.

A solution of 12 parts of 1-benzhydryl-4-formamidopiperazine in 140 parts of warm tetrahydrofuran is added portionwise to a suspension of 2 parts of lithium aluminum hydride in tetrahydrofuran. The resultant mixture is refluxed for 4 hours and then allowed to stand at room temperature for 16 hours. Excess lithium aluminum hydride is decomposed by the addition of 2.4 parts of methanol in tetrahydrofuran to the reaction mixture. The mixture is then hydrolyzed by the addition of 2 parts of water, 2 parts of 5 N sodium hydroxide solution, and 6 parts of water. The reaction mixture is filtered to remove the insoluble salts and the solvent is evaporated from the filtrate to give a residual oil. The oil is dissolved in methanol and mixed with an excess of ethanolic hydrogen chloride to give 1-benzhydryl-4-methylaminopiperazine dihydrochloride melting at about 237–242° C. with decomposition.

Example 2

A solution of 5.6 parts of crude 1-benzhydryl-4-methylaminopiperazine and 46 parts of dry ethyl formate is refluxed for 16 hours. The resultant mixture is cooled and diluted with 33 parts of hexane. 1-benzhydryl-4-(N-methylformamido)piperazine precipitates and is filtered, washed, and dried. This compound melts at about 195–189° C.

A solution of 3.8 parts of 1-benzyhydryl-4-(N-methylformamido)piperazine in 35 parts of tetrahydrofuran is added to a suspension of 1 part of lithium aluminum hydride in tetrahydrofuran. The resultant mixture is refluxed for 4 hours and then allowed to stand at room temperature for 15 hours. The crude product is then isolated from the reaction mixture by the procedure described in Example 1 for isolation of 1-benzhydryl-4-methylaminopiperazine from the lithium aluminum hydride reduction of 1-benzhydryl-4-formamidopiperazine. The crude amine is dissolved in a mixture of methanol and ether and mixed with an excess of alcoholic hydrogen chloride to give 1-benzhydryl-4-dimethylaminopiperazine dihydrochloride melting with decomposition at about 200–250° C. The free base of this compound has the following formula

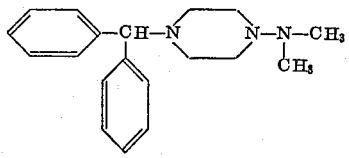

Example 3

A mixture of 5 parts of 1-benzhydryl-4-aminopiperazine, 1.16 parts of acetone, 40 parts of ethanol, and 2.2 parts of acetic acid is hydrogenated over 0.3 part of platinum oxide for 1.5 hours at 119–133 atmospheres. The reaction mixture is filtered to remove the catalyst and the solvent is evaporated from the filtrate to leave a residual oil which is distributed between a mixture of dilute sodium hydroxide solution and benzene. The benzene layer is separated, washed with water, and dried over potassium carbonate. The solvent is evaporated to leave a crystalline residue which is recrystallized from 2-propanol to give 1-benzhydryl-4-isopropylaminopiperazine melting at about 65–67° C.

Example 4

A solution of 7 parts of 1-benzhydryl-4-benzalaminopiperazine in 56 parts of tetrahydrofuran is added to a suspension of 1 part of lithium aluminum hydride in 350 parts of tetrahydrofuran and the mixture is refluxed for 20 hours under a nitrogen atmosphere. The reaction mixture is cooled and excess lithium aluminum hydride is decomposed by the cautious addition of 1.6 parts of methanol in tetrahydrofuran. The resultant mixture is hydrolyzed by the addition of, successively, 1 part of water, 1 part of 5 N sodium hydroxide solution, and 3 parts of water. The reaction mixture is filtered to remove the precipitated salts and the solvent is evaporated from the filtrate to give a residue which is then crystallized from 20 parts of absolute ethanol. The product is then recrystallized from 12 parts of absolute ethanol to give 1-benzhydryl-4-benzylaminopiperazine melting at about 85–94 C. This compound has the following formula

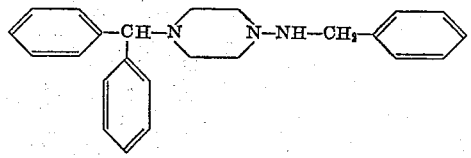

Example 5

14.4 parts of 1-benzhydryl-4-(4-chlorobenzalamino)piperazine is reduced with 2.3 parts of lithium aluminum hydride according to the procedure described in Example 4. Tetrahydrofuran is the solvent. The crude product is recrystallized twice from hexane to give 1-benzhydryl-4-(4-chlorobenzylamino)piperazine melting at about 82–85° C.

If an equivalent quantity of the appropriate hydrazone is substituted for the 1-benzhydryl-4-(4-chlorobenzalamino)piperazine and the above procedure is repeated, the following compounds are obtained;

1-benzhydryl-4-(4-fluorobenzylamino)piperazine.
1-benzhydryl-4-(2-chlorobenzylamino)piperazine.
1-benzhydryl-4-(4-iodobenzylamino)piperazine.

Example 6

A solution of 1.0 part of dimethylamine borane in 10 parts of glacial acetic acid is added portionwise, with cooling at about 15–18° C., to a solution of 4.6 parts of 1-(4-chlorobenzhydryl) - 4 - (3,4-methylenedioxybenzalamino)piperazine and 16 parts of glacial acetic acid. The resultant mixture is allowed to stand at 15–30° C. for 1.5 hours and it is then heated at 90–120° C. for about 3 hours. The reaction mixture is cooled and diluted with ice water and excess sodium hydroxide solution. The sticky precipitate which forms is separated and dissolved in benzene, and the benzene solution is washed thoroughly with water and dried over potassium carbonate. The solvent is evaporated from the benzene solution to leave a viscous syrup which is dissolved in 70 parts of ether and filtered. The resultant filtrate is then mixed with an ether solution of 2 parts of oxalic acid. The solid which precipitates is filtered, washed with ether, and dried to give 1-(4-chlorobenzhydryl) - 4 - (3,4-methylenedioxybenzylamino)piperazine dioxalate melting at about 90-120° C.

When 1-benzhydryl-4-benzalaminopiperazine is reduced with dimethylamine borane according to the above procedure, there is obtained 1-benzhydryl-4-benzylaminopiperazine melting at about 106–109° C.

Example 7

The procedure of Example 6 is repeated, but the reactants are 7.5 parts of 1-(4-chlorobenzhydryl)-4-benzalaminopiperazine and 1.2 parts of dimethylamine borane in acetic acid. The crude product is dissolved in ether and mixed with an ether solution of maleic acid to give 1-(4-chlorobenzhydryl)-4-benzylaminopiperazine maleate melting at about 114–120° C.

In a similar manner, 1-(2-chlorobenzhydryl)-4-benzalaminopiperazine is converted to 1-(2-chlorobenzhydryl)-4-benzylaminopiperazine, 1-(4-fluorobenzhydryl)-4-benzalaminopiperazine gives 1-(4-fluorobenzhydryl-4-benzylaminopiperazine, and 1-(4-iodobenzhydryl) - 4 - benzalaminopiperazine is reduced to 1-(4-iodobenzhydryl)-4-benzylaminopiperazine.

Example 8

A mixture of 9 parts of 1-benzhydryl-4-amino-piperazine, 5.36 parts of phenylacetone, 2.4 parts of glacial acetic acid, and 40 parts of ethanol is hydrogenated over 0.5 part of platinum oxide for 2.8 hours at 112–131 atmospheres. The resultant mixture is filtered to remove the catalyst and the solvent is evaporated from the filtrate to leave a residue which is distributed between benzene and dilute sodium hydroxide solution. The benzene layer is separated, washed with water, and dried over potassium carbonate. The solvent is evaporated from the benzene solution to leave a residue which is recrystallized from 2-propanol to give 1-benzhydryl-4-(α-methylphenethylamino)piperazine melting at about 73–76° C. This compound has the following formula

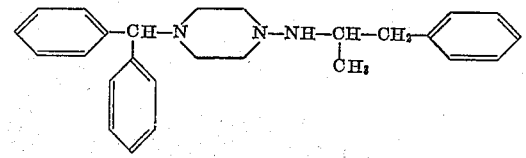

Example 9

1-benzhydryl-4-benzylaminopiperazine is refluxed with ethyl formate to give, after isolation of the product according to the procedure described in Example 2, 1-benzhydryl-4-(N-benzylformamido)piperazine. This compound melts at about 111–113° C. after recrystallization from hexane.

A solution of 4 parts of 1-benzhydryl-4-(N-benzylformamido)piperazine in tetrahydrofuran is added portionwise to a suspension of 1 part of lithium aluminum hydride in tetrahydrofuran. The resultant mixture is refluxed for 3 hours and the product is isolated from the reaction mixture according to the procedure described in Example 4. The crude product is dissolved in ether and mixed with an ether solution containing an excess of maleic acid. The solid which precipitates is separated and crystallized from a mixture of acetone and ether to give 1-benzhydryl-4-(N-methylbenzylamino)piperazine dimaleate melting at about 125–128° C. The free base of this compound has the following formula

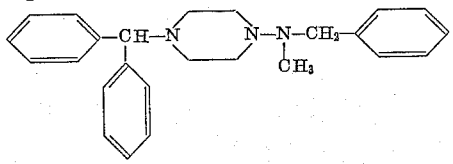

Example 10

To a solution of 8.8 parts of 1-benzyhydryl-4-aminopiperazine in 120 parts of warm 2-propanol is added 4.1 parts of 4-hydroxybenzaldehyde. The mixture is boiled gently for 5 minutes and then heated to evaporate the solvent. The residual solid is recrystallized first from benzene, then from the mixture of ethyl acetate and hexane, and finally from a mixture of benzene and heptane. The product is then dried at 110° C. at reduced pressure to give 1-benzhydryl-4-(4-hydroxybenzalamino)piperazine melting at about 158–159.5° C.

The 1-benzhydryl-4-(4-hydroxybenzalamino)-piperazine is dissolved in glacial acetic acid and reduced with dimethylamine borane according to the procedure described in Example 6. This gives 1-benzhydryl-4-(4-hydroxybenzylamino)piperazine. This compound has the following formula

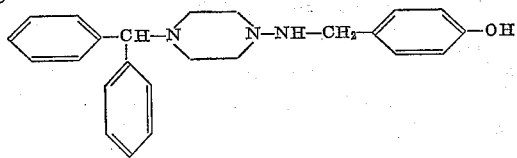

What is claimed is:
1. A compound of the formula

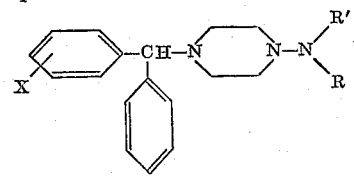

wherein X is selected from the group consisting of hydrogen and halogen; R is selected from the group consisting of lower alkyl and Ar(lower alkyl)— wherein Ar is selected from the group consisting of phenyl, halophenyl, methylenedioxyphenyl, and hydroxyphenyl; R' is selected from the group consisting of hydrogen and methyl.

2. A compound of the formula

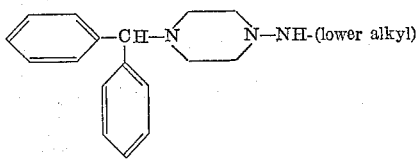

3. 1-benzhydryl-4-isopropylaminopiperazine.
4. A compound of the formula

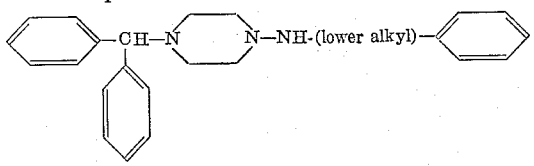

5. 1-benzhydryl-4-benzylaminopiperazine.
6. 1 - benzhydryl - 4 - (α - methylphenethylamino)-piperazine.
7. A compound of the formula

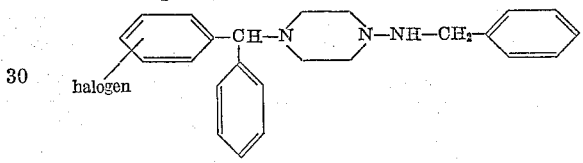

8. 1 - (4 - chlorobenzhydryl) - 4 - (3,4 - methylenedioxybenzylamino)piperazine.
9. A compound of the formula

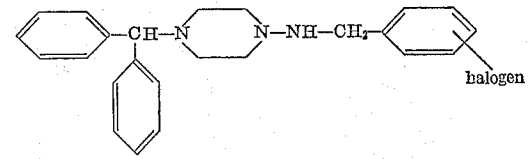

10. 1 - benzhydryl - 4 - (4 - chlorobenzylamino)piperazine.
11. 1 - (4 - chlorobenzhydryl) - 4 - benzylaminopiperazine.

References Cited in the file of this patent
UNITED STATES PATENTS

| | | |
|---|---|---|
| 2,663,706 | Conroy | Dec. 22, 1953 |
| 2,663,707 | Conroy et al. | Dec. 22, 1953 |

FOREIGN PATENTS

| | | |
|---|---|---|
| 942,029 | Germany | Apr. 26, 1956 |
| 715,236 | Great Britain | Sept. 8, 1954 |

OTHER REFERENCES

Yale et al.: Journal American Chemical Society, vol. 75, page 1933 (1953).